US006478915B1

(12) United States Patent
Schmalbruch et al.

(10) Patent No.: US 6,478,915 B1
(45) Date of Patent: Nov. 12, 2002

(54) METHOD OF EDGE FOLD SEALING

(75) Inventors: Jörg Schmalbruch, Königslutter (DE);
Peter W. Merz, Wollerau (CH);
Patricia Bucher, Zürich (CH);
Karl-Heinz Sonnenberg, Wolfsburg
(DE); Volker Beckord, Hannover (DE)

(73) Assignees: Volkswagen AG (DE); **Sika AG vorm.
Kaspar Winkler & CO** (CH)

( * ) Notice: Subject to any disclaimer, the term of this patent is extended or adjusted under 35 U.S.C. 154(b) by 0 days.

(21) Appl. No.: 09/541,661

(22) Filed: Apr. 3, 2000

(30) Foreign Application Priority Data

Apr. 1, 1999 (DE) .......................... 199 15 089
Jul. 26, 1999 (DE) .......................... 199 34 995

(51) Int. Cl.$^7$ ...................... B32B 3/04; B32B 31/28
(52) U.S. Cl. ............ 156/216; 156/273.5; 156/275.5; 156/275.7
(58) Field of Search ............... 156/273.5, 275.3, 156/275.5, 275.7, 272.2, 295, 216, 379.7; 29/509, 458

(56) References Cited

U.S. PATENT DOCUMENTS 4,605,465 A * 8/1986 Morgan .................. 156/273.3
4,719,689 A * 1/1988 Yamamoto et al. ............ 29/458
4,950,348 A * 8/1990 Larsen .................... 156/275.3
5,064,494 A * 11/1991 Duck et al. ............... 156/273.5

FOREIGN PATENT DOCUMENTS

| DE | 3314896 | 10/1983 |
| DE | 3621758 | 7/1987 |
| DE | 4420085 | 1/1996 |
| DE | 19748786 | 5/1999 |
| GB | 2119810 | 11/1983 |

* cited by examiner

*Primary Examiner*—Michael W. Ball
*Assistant Examiner*—Todd J. Kilkenny
(74) *Attorney, Agent, or Firm*—Baker Botts LLP

(57) ABSTRACT

A method of sealing body parts such as an edge fold of a motor vehicle component, for example a door, a rear or front flap or a sliding roof panel, includes a two-step pre-cross-linking of the sealing composition in the rough body part. In a first step the surface of a UV-active sealing composition is pre-cross-linked by UV irradiation, and in a second step immediately following, the edge fold adhesive and the sealing composition are hardened by thermal action. The edge-sealed body parts produced by the method are transportable and are of visually and functionally satisfactory quality after passing through cleaning baths and after thermal hardening in a KTL kiln. Since the sealing is carried out in the rough body part rather than during the coating process, the method provides a substantial potential cost saving.

18 Claims, 1 Drawing Sheet

METHOD OF EDGE FOLD SEALING

BACKGROUND OF THE INVENTION

This invention relates to methods of edge fold sealing at the edges of body parts.

For edge fold sealing in motor vehicle construction, a hardenable material is commonly laid over the outwardly open part of the fold, usually in the form of a bead. The hardenable material is gelled in a first hardening operation, for example by inductive heating of the sheet metal in the region of the hardenable composition, and is then completely cured in a following hardening operation, which may take place, for example, in a KTL, i.e., "cathodic dip coating") kiln. As the hardenable composition, polyvinyl chloride (PVC) is often employed.

This method presents problems when the hardenable material encloses pockets of air or absorbs liquids or gases before final hardening that will expand during subsequent kiln hardening and form outwardly visible blisters. These blisters in the first place impair the visual appearance of the sealed edge and in the second place form weak spots permitting corrosive attack in the seal.

In an alternative conventional finishing step in the production of vehicle parts, for example doors, hatch and hood flaps, sliding roof panels and the like, two sheet metal parts are connected by folding the edge of an outer part over the edge of an inner part. Thus, in building the unfinished rough body part, an adhesive is first applied to the oiled metal sheet, generally consisting of steel, hot-galvanized or electrically galvanized steel or aluminum, along the edge of the outer part, generally by "swirl" processes in a layer having a thickness of about 0.2 mm and, after insertion of the inner part, the outer edge of the outer part is rolled over the periphery of the inner part. Only then is the corrosion-sensitive edge of the outer part sealed by coating, usually by hand, with a sealant such as PVC plastisols for example. For reasons of production technology, quality and economy, it would be desirable to eliminate such edge fold sealing from the coating process and relegate it to construction of the rough body part, i.e. to employ the first method described above. In other words, there should be no material applications in the coating process that might impair the coating surface in any way. Hitherto, this objective has not been satisfactorily achieved, since as yet no dependable and economical procedure is available for the purpose.

German Offenlegungsschift No. 33 14 896 describes an adhesive for edge fold sealing that is pre-cross-linked by ultraviolet (UV) irradiation and is later finish-hardened in the kiln after passing through the cleaning baths at temperatures of around 180° C. together with the KTL priming. Apart from the relative simplicity of UV irradiation, it also has the disadvantage that the resulting hardening, and hence the cross-linking as well, takes place only from the outside in. For layer thicknesses greater than 0.3 mm, adequate pre-cross-linking can not be assured even with increased irradiation time, and the underlying layers remain un-cross-linked in a pasty condition. This pasty layer, beneath the pre-cross-linked surface has significant negative effects on the visual appearance of the seal. First, since the parts are at times transported manually, one consequence is that the adhesive, while not tacky, is not solid, resulting in fingerprints which may constitute a visual drawback. Second, there is danger that this uncross-linked material may be forced out of the seal upon thermal hardening in the KTL kiln as a result of expansion of the air enclosed between the edge fold bond and the seal. Third, upon subsequent cooling, the pasty seal material may be drawn back in the edge fold. Fourth, adhesives tend, especially in un-cross-linked condition, to absorb moisture, leading to formation of blisters upon thermal exposure in the KTL kiln.

The conditions described above are significant in the sense that it is desirable for reasons of economy to produce the parts in a finished form, that is, including the seal, at a central station and ship them from the central station to production lines which may be located in different parts of the world where they go directly into the cleaning bath which is the first step in the coating process. This procedure involves a substantial potential saving since the rough body parts and the sealing steps, which are in any event unwelcome in the coating process, can be avoided on the production line. Moreover, any new sealing process should be capable of integration in existing finishing operations on the rough body parts satisfactorily and without major financial outlay. In this respect, the requirement for an additional kiln would be absolutely unacceptable.

SUMMARY OF THE INVENTION

Accordingly, it is an object of the present invention to provide a method of edge fold sealing which overcomes disadvantages of the prior art.

Another object of the invention is to provide a method of edge fold sealing in which blister formation due to enclosed gases or liquids is suppressed in the subsequent kiln treatment, and/or good "handling" of the sealed parts is assured throughout process.

These and other objects of the invention are attained by providing a method of edge fold sealing which includes pre-hardening of a seal in a plurality of steps which may include ultraviolet radiation hardening and/or thermal hardening by infrared radiation, inductive heating and hot air impingement and/or reactive hardening without any external application of energy.

In accordance with the invention, a special process for the production of vehicle components, and particularly a new method of edge fold sealing, is provided in which fabrication is greatly simplified and quality enhanced.

Thus, by the method of the present invention, the disadvantages of the prior art are overcome, and edge fold sealing is carried out that satisfies all requirements for secure production of attachments and, in particular, for worldwide transport of "rough" or oiled parts, otherwise known as "parts tourism." In such cases, it is important for the visual quality of the edge fold seal to remain perfect even after prolonged transport of the parts through various climate zones and to ensure a smooth surface without pits, cracks, etc. Furthermore, the method may be applied to the rough body parts without any major fixed investment, and substantial manufacturing advantages can be gained by the new method.

According to a preferred embodiment of the invention, hardening of the seal takes place by a photochemical reaction, induced by light, in particular UV light, combined with a multi-step hardening procedure. Depending on the kind of seal, the UV light has a depth of penetration from about 0.01 to 1 mm, so that a surface hardening of the seal is achieved but deeper penetration of the UV radiation is also possible. The seal surface thus hardened protects against the entry of gases or liquids into the seal so that, upon later thermal hardening, no blisters will be raised. In addition, with such a surface hardening, emergence of any gases already contained in the seal is suppressed or prevented during thermal hardening.

Advantageously, the photochemical hardening is accomplished in such manner that, upon subsequent thermal hardening, the region of the composition that has already been photochemically hardened will be further hardened by the thermal hardening, i.e. so that functional groups which are already present for the photochemical as well as the thermal hardening will also be thermally cross-linked to enhance the hardening. In this way, an especially stable surface of the sealing composition is created.

For all embodiments of the method, a sealing procedure may be employed in which hardening is an exothermal process, so that once initiated, the hardening process continues at least in part, and correspondingly a more complete hardening is achieved. For this purpose, the sealing may combine reactive sealing components so as to be capable of initiating the hardening process without application of external energy.

In a further embodiment according to the invention, at least two unlike hardening processes are carried out prior to coating of the sealed body part. Preferably one of the hardening processes effects hardening of the outer surface of the seal and the other hardening process hardens the region of contact of the seal with the body part. In this way the method assures that the seal will absorb no liquid during the coating process, in particular liquid from a liquid cleaning preceding coating such as an aqueous solution and/or an aqueous immersion coating that would lead to blister formation upon subsequent thermal hardening, for example, in a KTL kiln.

In another embodiment, the thermal hardening, at least in a first stage, is kiln-free or accomplished by only partial heating of the body parts that are provided with the seal. In this way, a favorable overall procedure is achieved in that a hardening sufficient to prevent subsequent blister formation is integrated in the process as a whole without major outlay.

In still another embodiment of the invention, the process is carried out so that the two unlike hardening processes are conducted in succession at a time interval of less than 2 hours. In this way, a sufficient hardening of the seal is achieved without permitting it to absorb any significant quantity of gases or liquids that might lead to the problems outlined above. A time interval of less than 1 hour, preferably less than 20 minutes, desirably less than 5 minutes, is advantageous. That is, the two hardening processes preferably take place simultaneously or in immediate succession, without any additional interposed steps.

According to the invention, the alternative embodiments may advantageously be combined with each other.

The method of the invention is based on at least two-step cross-linking of the edge fold seal. Thus in a first step, a UV-active sealing composition is hardened by UV irradiation and, in a second directly following step, advantageously both the edge fold adhesive and the seal are cross-linked from the inside by thermal heating.

The hardening from the outside by UV irradiation partially cross-links the edge fold seal, effecting firstly a graspability or solidity of the seal surface important for manual handling, secondly a wash-out resistance to the liquids circulating against it at up to 70° C. under high pressure in the cleaning baths for degreasing the oiled bodywork, phosphating, and passing through the cathodic dip coating bath (KTL), and thirdly, due to the further cross-linking in a second hardening process, assures seal quality for a long exposure time, partly under hot-moist climatic conditions for more than 3 weeks. Exposure time specifies the time within which the adhesive performs the specified function and suffers no quality drawbacks after complete hardening in the KTL kiln, which takes place at temperatures around 180° within about 25 minutes. In a less than 100% cross-linked condition, the adhesive generally tends to absorb water, leading to blister formation upon heat hardening and possibly adversely affecting both appearance and strength.

For the hardening process producing adhesive cross-linking under UV radiation, activated double bonds, as for example compounds containing acrylate groups, the radical polymer reaction is triggered by way of a photoinitiator which is a radical former initiated by UV rays. Depending on the particular photoinitiator, the optimal wavelength is in the range from 200 to 400 mm. To achieve a satisfactory result in terms of solidity, etc., an irradiation time of less than 30 seconds, preferably less than 5 seconds, at an intensity of preferably 0.001 to 50 watts/cm$^2$, is suitable. This makes possible a procedure in which, for example, the UV irradiation can be carried out by robots directly after application of the seal and in the same operation. The UV lamp is advantageously located directly following the nozzle applying the sealing material.

The thermal hardening from within partially cross-links the edge fold bond and the seal and effects a positional stability, precluding relative displacement of the two sheet-metal parts, i.e. inner part and the outer part. As sources of thermal energy, induction heating, infrared (IR) irradiation, hot air blasts, etc. are useful. In the case of IR irradiation, although the costly fixed investment for an induction plant may be avoided, it is not as effective as inductive heating.

As a result of the invention it was found that a two-stage hardening process is adequate to assure sufficient positional stability of the parts being attached even without complete hardening since the outer seal part hardened with UV radiation also contributes to structural strength. If desired, the IR lamps may be positioned on the robot to irradiate the seal directly after UV irradiation. For satisfactory quality of the sealing surface, it is preferable that the UV irradiation takes place prior to the thermal exposure. This assures that any air contained between the edge fold bond and the seal will be kept inside during thermal heating.

Furthermore, in another preferred embodiment, the reaction induced by UV irradiation is accelerated by heating the sealing composition, for example, to temperatures around 60° C. This may be done by heating the sealing composition itself before or as it is applied and/or heating the edge fold shortly before applying the sealing composition, for example, by a hot air blast and/or inductive heating, in order thereby to pre-heat the applied sealing composition.

Preferably, heating by IR and/or a hot air blast is employed. This definitely reduces or eliminates the danger of warping of parts since the parts are less severely stressed thermally than is the case in inductive heating for example.

Visual imperfections resulting from air inclusion in the edging between bonding and sealing are greatly reduced since the adhesive with twofold pre-hardening builds up sufficiently high strength in a short time and thus prevents both air inclusions upon heating in the KTL kiln as well as withdrawal of adhesive material into the edging upon cooling.

Since the sealing can be done more economically and with savings of material by the use of robots during rough fabrication rather than in a coating shop by hand as is conventional, resources such as time and space in the coating shop can be saved.

The method according to the invention provides advantages in properties such as good handling and positional stability as well as good exposure time, thus meeting all requirements for secure transport both internally and externally, and it overcomes the disadvantages of the prior art methods in which quality is impaired by blister formation. The advantages according to the invention permit fabrication of parts having edge seals, as for example doors, front and rear flaps, sliding roof panels, etc., at a central location and shipment of the parts to outside production lines. This "parts tourism" is otherwise known as CKD ("completely knocked down") and is economical because fixed investment for the production of rough bodywork can be reduced.

For optimal processing the edge fold adhesive should be applicable in thin layers and exhibit good oil wetting. After heat hardening in the KTL kiln, the adhesive should provide a good, aging resistant adhesion to the metal substrate, a strength of more than 15 Mps and an ultimate elongation of at least 5%.

For the seal, the same adhesive used in the edge fold may be employed, in which case it will contain hardenable components that, in the most preferred embodiments, may be hardened either by UV irradiation or thermally. In that case the ultimate elongation should be at least 15%, preferably 30%, to avoid any risk of cracking under the thermal stresses.

The adhesives described above are generally formulated on the basis of epoxide technology, rubber technology or acrylate technology. etc., and also in combination with suitable polyurethane components or organic polymer fillers. Some examples are given in German Offenlegungsschrift No 33 14 896, to which reference is made also with respect to the conditions of reaction. The seal is preferably applied in a thickness of 150–4000 microns, desirably in the range of 350–1000 microns. Preferably the seal is applied in the form of a bead, the application of the bead being carried out for example as a "swirl."

A light-induced hardening, in particular by irradiation with UV light, may advantageously take place immediately after application of the seal, preferably not later than a few minutes after application. The UV irradiation may take place at the same time as, previous to, or after a further hardening, in particular an IR, hot air stream or induction hardening, in which the sheet metal areas to be sealed and/or immediately adjacent areas may be heated.

Depending on the particular sealant employed, care should be taken, especially in case of insufficient exothermal hardening, to avoid a hardening which may possibly fail if the hardening process is not carried out with sufficient intensity. To assure success of the hardening process, it is accordingly necessary to work with a sufficient intensity of the hardening parameters (UV light, heat, etc.) to assume adequate hardening.

Advantageously, the sealing is carried out with a material for which the minimum hardening temperature is adjusted to not over 140° C., for example, so that an induction hardening is possible. The epoxide resins commonly employed, which require a hardening temperature of about 150° C. up to 170° C., are therefore less suitable. However, such epoxides may be employed in the interior of the fold, since the final hardening in the KTL kiln does not present that problem.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
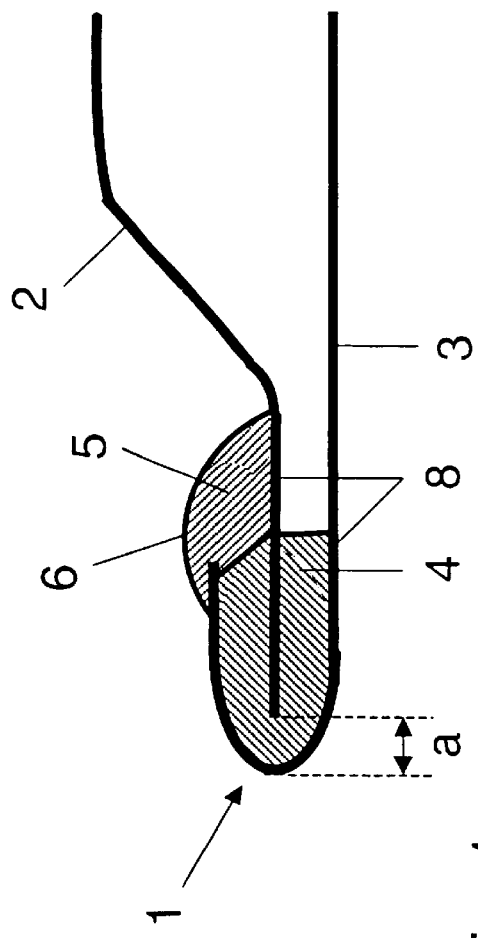
FIG. 1 is a sectional view showing a representation embodiment of a door fold with applied seal according to the invention.

In the typical embodiment of the invention shown in FIG. 1, an edge fold 1 includes an outer door sheet 3 folded over an inner door sheet 2 and connected with an edge fold adhesive 4 in the neighborhood of the fold. 1. The edge fold adhesive 4 is applied before folding and is so proportioned in quantity that it fills the entire fold area at a distance from the edge of the inner door sheet 2 to the bend of fold. Over the outer fold area, a seal 5 is applied, which has a prehardened outer portion 6 cross-linked by UV radiation from the outside and hardened in interior regions 8 of the fold area 1 by inductive heating from below to such an extent that it becomes solid, resistant to inflating gases, and sealed to penetration of gases or liquids from the outside.

Figure 2:
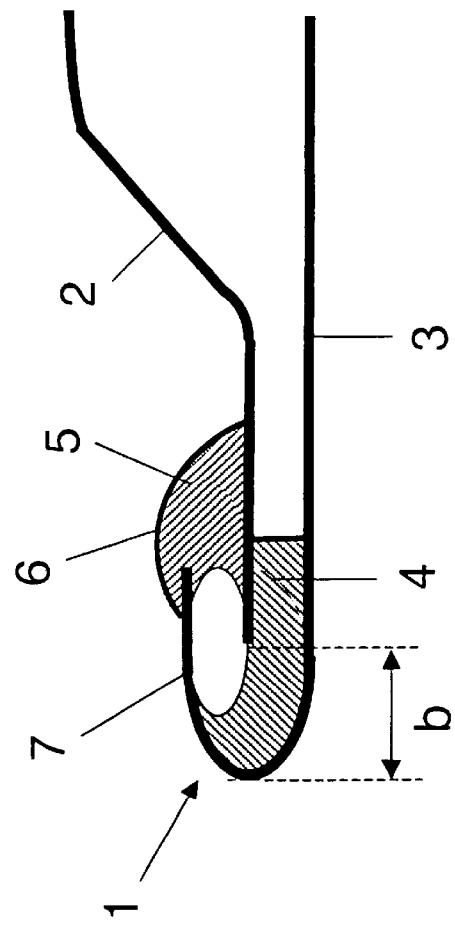
FIG. 2 is a similar view showing a section of a door fold with a possible sealing problem.

FIG. 2 shows the same fold 1 illustrated in FIG. 1, but with a displacement "b" of the edge of the inner door sheet 2 relative to the fold in the outer door sheet 3 rather than the smaller displacement "a" shown in FIG. 1, so that the quantity of edge fold adhesive 4 introduced does not completely fill the fold. As a result, during overlap with the seal 5, an air bubble 7 may be included, which may expand in the course of the hardening process conventionally carried on in the KTL kiln and therefore inflate the seal 5. In the process according to the invention, however, the seal 5 is doubly prehardened, by the two-step process including UV hardening and thermal hardening so that, upon subsequent final hardening in the KTL kiln, the enclosed air bubble 7 is not able to break through.

Although the invention has been described herein with reference to specific embodiments, many modifications and variations therein will readily occur to those skilled in the art. Accordingly, all such variations and modifications are included within the intended scope of the invention.

We claim:

1. A method of sealing an edge fold at an edge fold portion of a body part comprising applying an adhesive sealing composition to an edge fold portion of a body part, forming an edge fold in the edge fold portion, applying a radiation-hardenable sealing composition to the edge fold, and hardening the sealing compositions by at least two unlike hardening processes, one of the hardening processes being a photochemical radiation-hardening process for hardening the radiation-hardenable sealing composition and another hardening process being a thermal hardening process carried out in a plurality of separate heating steps, at least one step being carried out after the edge fold is formed.

2. A method according to claim 1 wherein at least one of the photochemical hardening process and a first step of the thermal hardening process are carried out in the absence of any prior coating or wetting of the body part.

3. A method according to claim 2 wherein the at least two hardening processes are carried out in the absence of any prior varnish coating of the body part.

4. A method of sealing an edge fold at an edge fold portion of a body part comprising applying an adhesive sealing composition to an edge fold portion of the body part, forming an edge fold in the edge fold portion, applying a radiation-hardening sealing composition to the edge fold, and hardening the sealing compositions by at least two unlike hardening processes which are carried out in the absence of any prior coating or wetting of the body part including a thermal hardening process carried out in a plurality of separate heating steps, at least one radiation-hardening process step being carried out after the edge is formed.

5. A method according to claim 4, wherein the radiation-hardening process hardens the outer surface of a seal formed by the sealing composition and the other hardening process hardens at least one of a portion of the seal which is in contact with the body part and an internal region of the seal.

6. A method according to claim 1 or claim 4 including a first thermal hardening process wherein kiln-free thermal hardening produces only partial hardening of the adhesive sealing composition on the body part and is carried out by at least one of inductive heating, IR radiation heating and hot air stream heating.

7. A method of sealing an edge fold at an edge fold portion of a body part comprising applying an adhesive sealing composition to an edge fold portion of the body part, forming an edge fold in the edge fold portion, applying a radiation-hardenable sealing composition to the edge fold, and hardening the sealing compositions by at least two unlike hardening processes, one of the hardening processes being a photochemical process for hardening the radiation-hardenable sealing composition and another hardening process being a thermal hardening process carried out in a plurality of separate heating steps, at least one radiation-hardening process step being carried out after the edge fold is formed, wherein the thermal hardening process is accomplished by heating of the body part using at least one of inductive heating, IR radiation heating, and hot air stream heating.

8. A method according to any one of claims 1, 4, and 7 wherein the unlike hardening processes are performed within a time interval of less than two hours.

9. A method of sealing an edge fold of an edge fold portion of a body part comprising applying an adhesive sealing composition to an edge fold portion of the body part, forming an edge fold in the edge fold portion, applying a radiation-hardenable sealing composition to the edge fold, and hardening the sealing compositions by two unlike hardening processes performed within a time interval of less than two hours, including a thermal hardening process carried out in a plurality of separate heating steps, at least one radiation hardening process step being carried out after the edge fold is formed.

10. A method according to any one of claims 1, 4, 7 and 9 wherein the unlike hardening processes are performed within a time interval of less than one hour.

11. A method according to claim 10 wherein the unlike hardening processes are performed within a time interval of less than twenty minutes.

12. A method according to claim 11 wherein the unlike hardening processes are performed within a time interval of less than five minutes.

13. A method according to any one of claims 1, 4, 7 and 9 wherein the hardening processes are selected from kiln hardening, inductive hardening, hardening by application of a hot air stream, photochemical hardening, and reactive hardening without any external energy supply.

14. A method according to any one of claims 1, 4, 7 and 9 wherein the unlike hardening processes are performed to produce at least one of the following results: a surface hardness of the sealing composition for achieving sufficient solidity to permit manual handling; a wash-out resistance to circulating cleaning baths up to 70° C. for degreasing of oiled bodywork parts for phosphating or for electronic dip coating; and resistance during exposure to hot and moist conditions for more than three weeks.

15. A method according to any one of claims 1, 4, 7 and 9 wherein the radiation hardening process step is carried out until the seal has sufficient strength in the region of contact with the body part to substantially prevent visual appearance deficiencies due to inclusions of air between the adhesive and the seal in the course of further processing.

16. A method according to any one of claims 1, 4, 7 and 9 wherein the radiation-hardenable sealing composition is heated to accelerate hardening produced by UV irradiation in a thermally preheated edge fold.

17. A method according to claim 16 wherein the edge fold is preheated by applying a hot air stream shortly before application of the sealing composition.

18. A method according to any one of claims 1, 4, 7 and 9 wherein an edge fold seal in a rough body part is prehardened both with a UV irradiation hardening step and thermally to produce edge fold bonding and wherein the resulting body part is transported to another location and subjected to at least one cleaning bath and a varnish coating and then thermal hardening of the sealing material is completed in a kiln.

* * * * *